United States Patent [19]
Hill et al.

[11] Patent Number: 5,997,037
[45] Date of Patent: Dec. 7, 1999

[54] AIR BAG WITH TETHER

[75] Inventors: Bruce R. Hill, Bloomfield Hills, Mich.;
Neftali Cortes, Chihuahua, Mexico

[73] Assignee: TRW Vehicle Safety Systems Inc.,
Lyndhurst, Ohio

[21] Appl. No.: 08/934,863

[22] Filed: Sep. 22, 1997

[51] Int. Cl.⁶ .................................................. B60R 21/16
[52] U.S. Cl. ..................................... 280/743.2; 280/728.1
[58] Field of Search ............................ 280/743.2, 743.1,
280/728.3, 728.2, 728.1, 729

[56] References Cited

U.S. PATENT DOCUMENTS

| | | | |
|---|---|---|---|
| 5,078,423 | 1/1992 | Fujita | 280/743.2 |
| 5,308,113 | 5/1994 | Moriset | 280/743.2 |
| 5,362,101 | 11/1994 | Sugiura et al. | 280/743.2 |
| 5,452,913 | 9/1995 | Hansen et al. | 280/728.1 |
| 5,568,938 | 10/1996 | Lindstrom | 280/743.2 |
| 5,613,698 | 3/1997 | Patercsak et al. | 280/743.1 |
| 5,678,858 | 10/1997 | Nakayama et al. | 280/743.2 |
| 5,813,696 | 9/1998 | Hill | 280/743.3 |

*Primary Examiner*—Peter C. English

*Attorney, Agent, or Firm*—Tarolli, Sundheim, Covell, Tummino & Szabo

[57] ABSTRACT

An air bag (30) has a base portion (40) and has a body portion (42) connected with the base portion and inflatable in a direction away from the base portion into an inflated condition. The air bag (30) includes first and second tethers (60, 70) which are sewn between the base portion (40) of the air bag and the body portion (42) of the air bag. The first tether (60) has a predetermined weakened portion (100 or 102). The second tether (70) has substantially higher elongation than the first tether (60). The second tether (70) has an effective length which is at least about the same as the effective length of the first tether (60). The air bag (30) has a partially inflated condition in which the first tether (60) is extended to its effective length and resist movements of the body portion (42) of the air bag away from the base portion (40). The first tether (60) is rupturable at the predetermined weakened portion (100 or 102) under the force of the inflating air bag (30) to enable movement of the air bag from the partially inflated condition to a fully inflated condition. The second tether (70) stretches during movement of the air bag (30) from the partially inflated condition to the fully inflated condition.

24 Claims, 4 Drawing Sheets

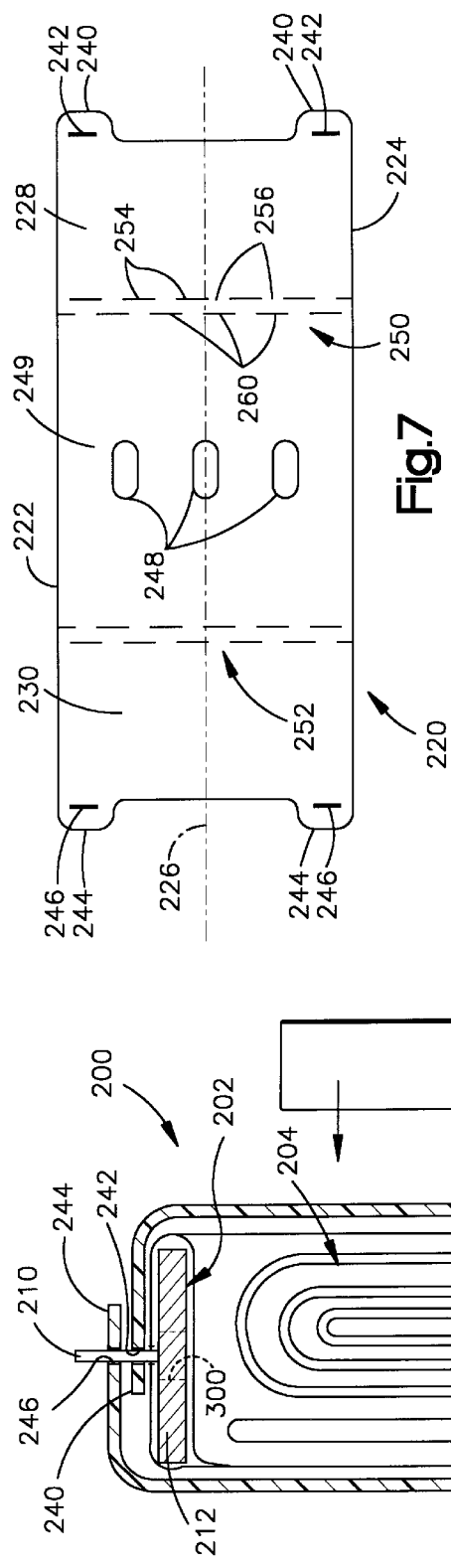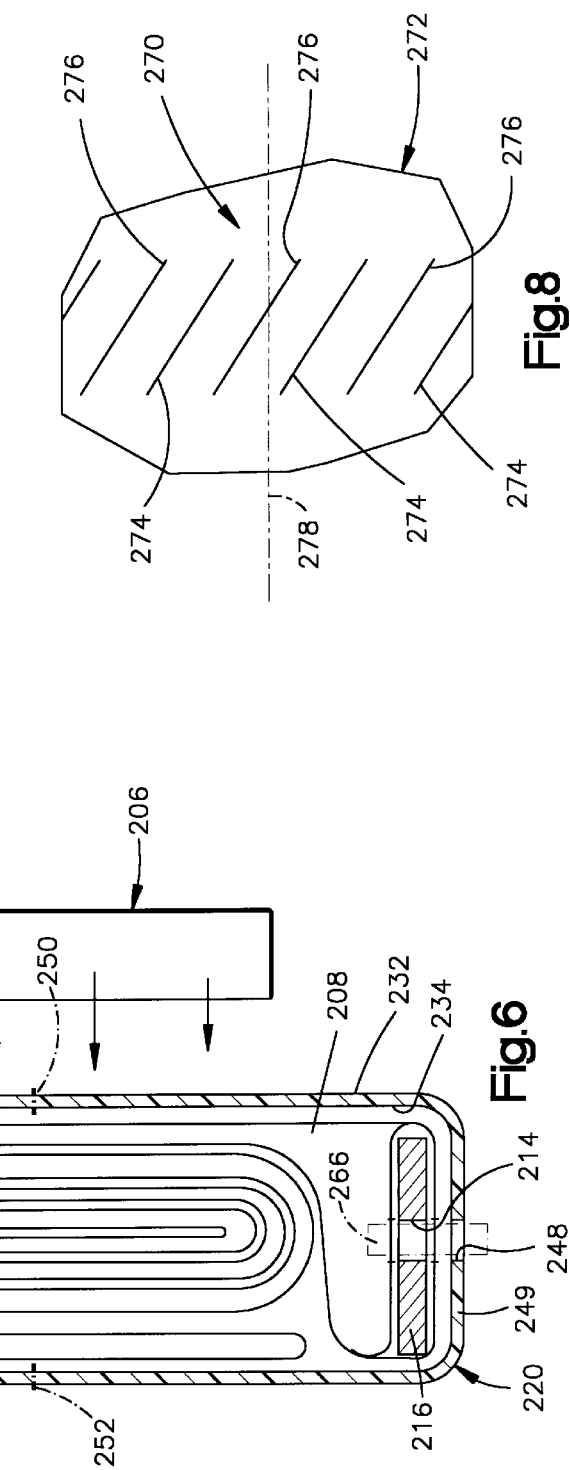

AIR BAG WITH TETHER

BACKGROUND OF THE INVENTION

1. Technical Field

The present invention relates to a vehicle safety apparatus and, in particular, relates to an apparatus including an inflatable vehicle occupant protection device, such as an air bag, for helping to protect a vehicle occupant.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as the instrument panel or a vehicle seat, for example. In the event of an impact to the vehicle of a magnitude above the predetermined threshold, the inflator is actuated, and the air bag is inflated into a position between the vehicle occupant and the adjacent structure of the vehicle.

It is known to use one or more tethers in an air bag to control the inflation of the air bag. A tether typically is sewn between and extends between two spaced apart portions of the air bag to control the shape of the air bag when inflated.

SUMMARY OF THE INVENTION

The present invention is a vehicle safety apparatus comprising an inflatable vehicle occupant protection device having a base portion and having a body portion connected with the base portion and inflatable in a direction away from the base portion into an inflated condition. The apparatus includes first and second tethers which are sewn between the base portion of the inflatable device and the body portion of the inflatable device. The first tether has a predetermined weakened portion. The second tether has substantially higher elongation than the first tether. The second tether has an effective length which is at least about the same as the effective length of the first tether. The inflatable device has a partially inflated condition in which the first tether is extended to its effective length and resists movement of the body portion of the inflatable device away from the base portion. The first tether is rupturable at the predetermined weakened portion under the force of the inflating inflatable device to enable movement of the inflatable device from the partially inflated condition to a fully inflated condition. The second tether stretches during movement of the inflatable device from the partially inflated condition to the fully inflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a view of a tether which forms part of the vehicle safety apparatus of FIG. 1;

FIG. 4 is an enlarged view of a predetermined weakened portion of the tether of FIG. 3;

FIG. 6 is a schematic view, partially in section, of a vehicle safety apparatus including a flexible wrap constructed in accordance with a third embodiment of the present invention;

FIG. 7 is a plan view of the wrap of FIG. 6; and

FIG. 8 is a fragmentary view of a portion of a vehicle safety apparatus constructed in accordance with a fourth embodiment of the present invention.

DESCRIPTION OF PREFERRED EMBODIMENTS

The present invention relates to a vehicle safety apparatus and, in particular, relates to an air bag module including an inflatable vehicle occupant protection device, such as an air bag, for helping to protect a vehicle occupant. The present invention is applicable to various vehicle safety apparatus constructions. As representative of the present invention, FIGS. 1–3 illustrate a vehicle safety apparatus or air bag module 10.

Figure 1:
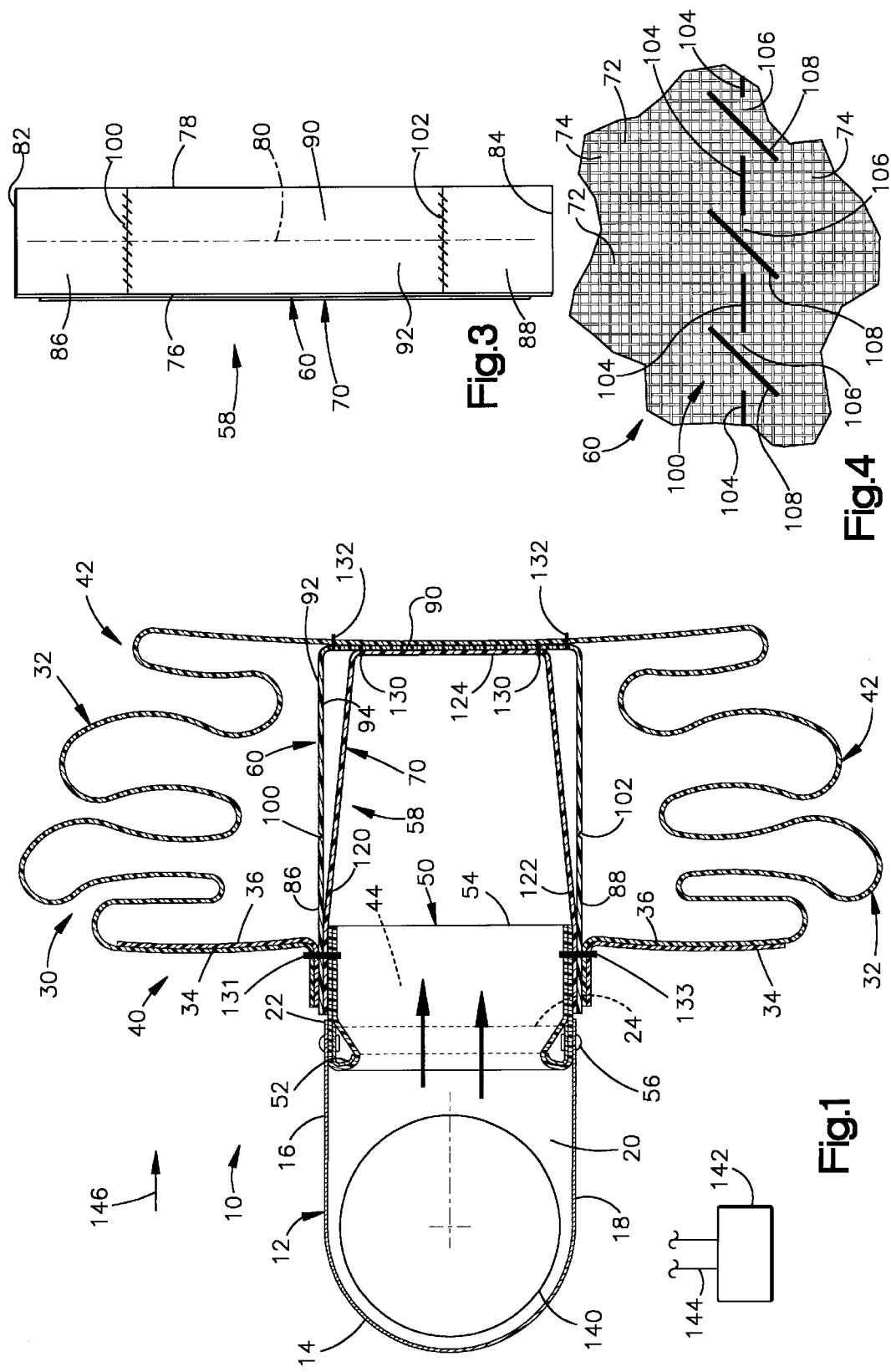
FIG. 1 is a sectional view of portions of a vehicle safety apparatus constructed in accordance with the present invention, including an air bag shown in a partially inflated condition.
Figure 2:
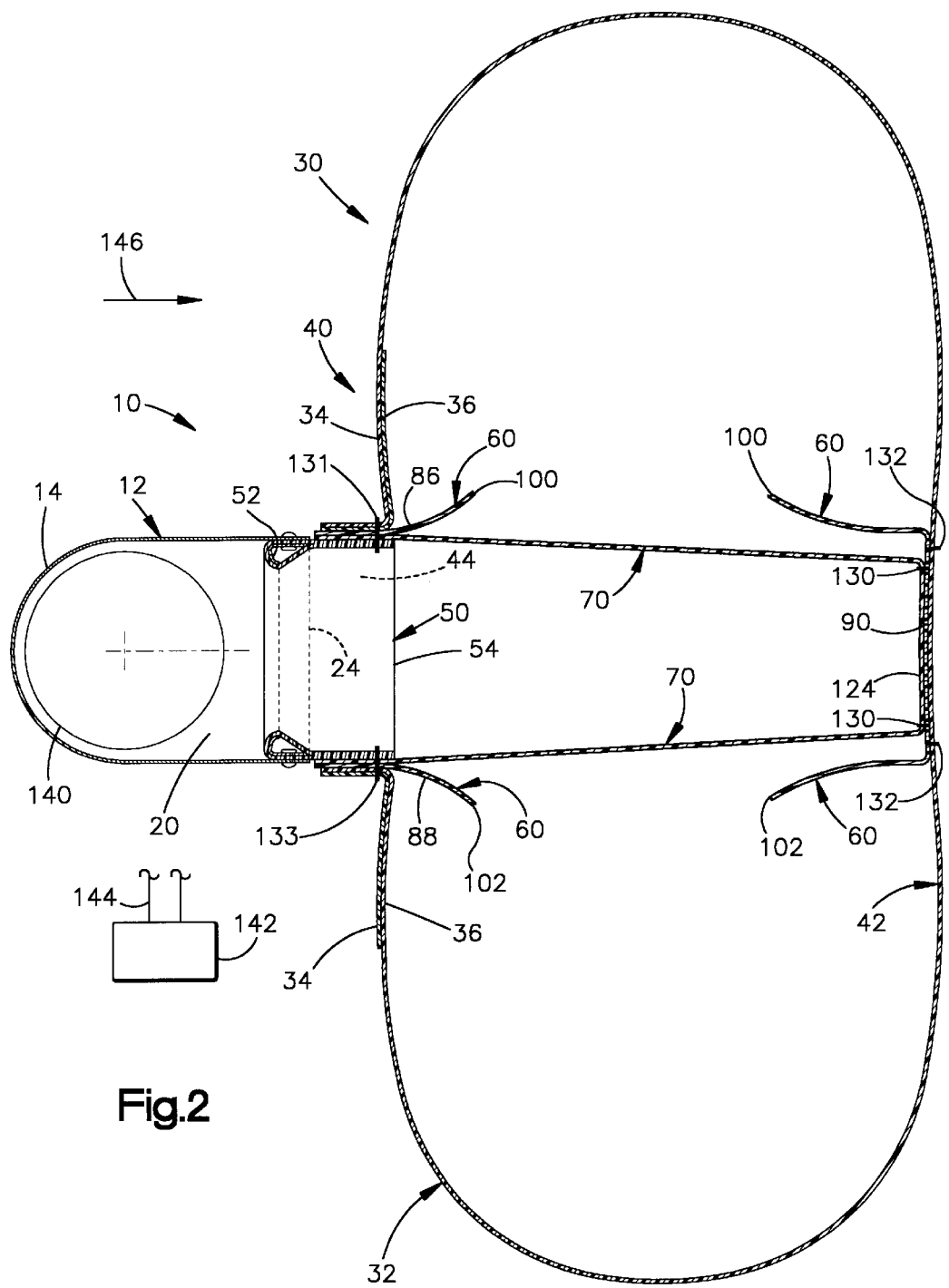
FIG. 2 is a view similar to FIG. 1 showing the air bag in a fully inflated condition.

The air bag module 10 includes a reaction canister or container indicated schematically at 12 (FIG. 1). The container 12 is made from sheet metal and has a generally C-shaped configuration including an arcuate back wall 14 which extends between parallel upper and lower walls 16 and 18. The walls 14, 16 and 18 of the container 12 partially define a chamber 20 in the container. An outer edge portion 22 of the container 12 defines a deployment opening 24 in the container opposite the back wall 14.

The air bag module 10 includes an air bag 30. The air bag 30 is preferably made from a fabric material such as woven nylon. The air bag 30 can alternatively be made from non-woven material, such as plastic film. The use of plastic film, in particular, would require inflation fluid vents to be formed in the air bag, as is known in the art.

The air bag 30 (FIG. 2) is illustrated as a cylindrical air bag of the type commonly used for helping to protect a front seat passenger of a vehicle. The air bag 30 includes an elongate, generally rectangular center panel 32 having first and second opposite end portions 34 and 36. The first end portion 34 of the center panel 32 overlies the second end portion 36 of the center panel. Two generally circular side panels (not shown) are sewn to the center panel 32 to form the completed air bag 30.

The air bag 30 as thus sewn includes a mouth portion or base portion 40, and a body portion 42. The end portions 34 and 36 of the center panel 32 form a part of the base portion 40 of the air bag. The end portions 34 and 36 of the center panel 32 include respective openings which overlie each other to form an inflation fluid opening 44 in the air bag 30.

A tubular retainer assembly 50 is sewn to the base portion 40 of the air bag 30. The retainer assembly 50 includes a retaining ring 52 and a retainer panel 54. The retainer assembly 50 is secured in a known manner, such as by the rivets indicated at 56, to the container 12 adjacent the deployment opening 24 in the container.

The air bag module 10 includes a tether assembly 58 for controlling inflation of the air bag 30. The tether assembly 58 includes a first tether 60 and a second tether 70.

The first tether 60 (FIG. 3) is made from a single piece of fabric material, such as woven nylon, and has a generally rectangular configuration. First and second side edges 76 and 78 of the first tether 60 extend parallel to a longitudinal axis or centerline 80 of the first tether 60. The side edges 76 and 78 are interconnected by parallel first and second end edges 82 and 84. The first tether 60 also has opposite first and second end portions 86 and 88 and an intermediate portion 90. The first tether 60 also has opposite first and second major side surfaces 92 and 94 (FIG. 1). The first tether 60 could, alternatively, have a different configuration, such as one with a generally circular intermediate portion located between rectangular end portions.

The fabric material of the first tether 60 includes a plurality of warp yarns or first fibers 72 (FIG. 4) which extend in the direction of force loading on the first tether during inflation of the air bag 30. When the first tether 60 (FIG. 1) is loaded during inflation of the air bag 30, the load on the tether is in a left-right direction as viewed in FIG. 1. The first fibers 72 extend parallel to the axis 80 of the first tether 60, that is, in a direction from top to bottom as viewed in FIGS. 3 and 4. The first fibers 72 are interwoven with a plurality of weft yarns or second fibers 74 which extend across the direction of load of the tether.

The first tether 60 has two predetermined weakened portions 100 and 102. The first weakened portion 100 is located between the intermediate portion 90 of the first tether 60 and the first end portion 86 of the first tether. The second weakened portion 102 of the first tether 60 is located between the intermediate portion 90 of the first tether and the second end portion 88 of the first tether. The second weakened portion 102 is identical in construction to the first weakened portion 100 and, therefore, is not described in detail.

The first weakened portion is in the form of a tear line which extends between the first and second side edges 76 and 78 of the first tether. At the first weakened portion 100, the fabric material of the first tether 60 is cut through or severed with a plurality of transverse cuts shown schematically at 104. The transverse cuts 104 extend generally perpendicular to the longitudinal axis 80 of the first tether 60. Each one of the transverse cuts 104 severs all of the first fibers 72 located between the ends of the transverse cut. The transverse cuts 104 are spaced apart from each other and define a plurality of gaps 106, one between each pair of adjacent transverse cuts 104. A plurality of first fibers 72 extend through each one of the gaps 106.

A plurality of diagonal cuts 108 extend through the gaps 106, preferably at an angle of about 45° to the longitudinal axis 80 of the first tether 60. The diagonal cuts 108 are spaced apart from each other and are spaced apart from the side edges 76 and 78 of the first tether 60. Each one of the diagonal cuts 108 extends through a respective one of the gaps 106 between a pair of adjacent transverse cuts 104.

The length and orientation of the diagonal cuts 108 are selected so that each diagonal cut severs every first fiber 72 in the respective gap 106 through which the diagonal cut extends. As a result, all the first fibers 72 of the first tether 60, that is, all the load-bearing fibers, are cut at the first weakened portion 100 of the first tether 60. There are no unsevered fibers extending in the direction of the force loading on the first tether 60.

The transverse cuts 104 could, alternatively, not extend to the side edges 76 and 78 of the first tether 60, to minimize fraying. In that case, substantially all the fibers of the first tether 60 extending in the direction of the load on the tether would be severed.

Because of the presence of the two predetermined weakened portions 100 and 102 of the first tether 60, the first tether 60 is rupturable at the predetermined weakened portions during inflation of the air bag 30, in a manner described below. Specifically, the predetermined weakened portions 100 and 102 cause the first tether 60 to rupture when the tensile load on the first tether, acting between the intermediate portion 90 of the first tether and the end portions 86 and 88 of the first tether, exceeds a predetermined threshold value.

The second tether 70 is generally similar in configuration to the first tether 60. The second tether 70 is made from a single piece of fabric material, and may be made from the same type of material as the first tether 60. The second tether 70 has a generally rectangular configuration including opposite first and second end portions 120 and 122 and an intermediate portion 124.

The material of the second tether 70 exhibits higher elongation than the material of the first tether 60. The term "elongation", as used herein, means the maximum permanent stretch, per unit of original length, induced in a body by a force that causes the body to break.

The second tether 70 does not have any predetermined weakened portions like the predetermined weakened portions 100 and 102 of the first tether 60. Thus, the second tether 70 has a uniform resistance to rupturing, or breaking, along its entire length.

The first tether 60 is sewn to the second tether 70 with stitching in the form of a circle of stitches or sew circle indicated schematically at 130. Although not illustrated, the end portions 86 and 88 of the first tether 60 may also be sewn to the end portions 120 and 122 of the second tether 70. The assembly 58 of the two tethers 60 and 70 is sewn between and extends between the base portion 40 of the air bag 30 and the body portion 42 of the air bag 30. The first end portions 86 and 120 of the tethers 60 and 70, respectively, are sewn together with the retainer panel 54 and the base portion 40 of the air bag 30, at one side of the inflation fluid opening 44, with a stitching section 131. The second end portions 88 and 122 of the tethers 60 and 70, respectively, are sewn together with the retainer panel 54 and the base portion 40 of the air bag 30, at one side of the inflation fluid opening 44, with a stitching section 133.

The intermediate portion 90 of the first tether 60 is sewn to the body portion 42 of the air bag 30 with stitching in the form of a circle of stitches or sew circle indicated schematically at 132. To minimize the number of needle holes in the air bag 30, the intermediate portion 124 of the second tether 70 is not sewn to the body portion 42 of the air bag 30.

The first tether 60 overlies the second tether 70 in the air bag 30. The predetermined weakened portions 100 and 102 of the first tether 60 are disposed between the retainer panel 54 and the sew circle 132 which joins the tether assembly 58 to the body portion 42 of the air bag 30.

The intermediate portion 90 of the first tether 60 is connected to the body portion 42 of the air bag 30 over a substantial area, and not merely at one small location. For example FIG. 1 illustrates the sew circle 132 extending through the body portion 42 of the air bag 30 at two locations spaced apart from each other by a substantial distance. These two locations are two points along the sew circle 132. The body portion 42 of the air bag 30 is connected to the intermediate portion 90 of the first tether 60 at all points along the sew circle 132. The size of the area of connection between the first tether 60 and the body portion 42 of the air bag 30 depends on the size and configuration of the stitching, such as the sew circle 132, which interconnects the first tether and the air bag.

The size of the area of connection between the first tether 60 and the body portion 42 of the air bag 30 also depends on the width of the intermediate portion 90 of the first tether. For example, the intermediate portion 90 of the first tether 60 could be substantially wider than the remainder of the first tether, and the sew circle 130 could be replaced with two parallel, linear sew lines extending across the width of the intermediate portion of the first tether. This type of configuration could provide a large area of connection between the first tether 60 and the body portion 42 of the air bag 30.

As can be seen from FIG. 3, the second tether 70 is slightly shorter than the first tether 60 when the tethers are in a free or unstressed condition. Because the sew circle 130 is smaller than the sew circle 132, however, the end portions of the tethers 60 and 70 (FIG. 1) line up when the tether assembly 58 is sewn to the air bag 30.

The second tether 70 is shorter than the first tether 60 by an amount equal to twice the radial distance between the sew circles 130 and 132. As a result, the first and second tethers 60 and 70 become taut at the same time, as can be seen from FIG. 1. The effective length of the second tether 70, that is, the length when first tautened and resisting air bag movement, is about the same as the effective length of the first tether 60. In the embodiment illustrated in FIG. 1, the second tether 70 has the same or substantially the same effective length as the first tether 60.

The air bag module 10 includes an inflator indicated schematically at 140. The inflator 140 is preferably an electrically actuatable inflator which contains a stored quantity of pressurized inflation fluid and an ignitable material for heating the inflation fluid. The module 10 alternatively could include a pyrotechnic inflator which uses the combustion of gas-generating material to generate inflation fluid in the form of gas to inflate the air bag 30, or an inflator which contains only a stored quantity of pressurized inflation fluid for inflating the air bag 30.

The air bag module 10 also includes known actuation means, indicated schematically at 142, for sensing a collision involving the vehicle and for electrically actuating the inflator 140 in response to the sensing of a collision. The actuation means 142 may include a deceleration sensor and vehicle electric circuitry for actuating the inflator 140 in response to sensing a vehicle deceleration indicative of a vehicle collision having severity greater than a predetermined threshold value.

In the event of an impact to the vehicle of a magnitude greater than the predetermined threshold value, the actuation means 142 provides an electrical signal over lead wires 144 to the inflator 140. The inflator 140 is actuated in a known manner to direct inflation fluid under pressure into the chamber 20 in the container 12. The walls of the container 12 direct the inflation fluid through the deployment opening 24 in the container and into the inflation fluid opening 44 in the air bag 30. The inflation fluid flows through the base portion 40 of the air bag 30 into the body portion 42 of the air bag. The air bag 30 inflates from a folded, stored condition (not shown) to a partially inflated condition illustrated in FIG. 1, and then to a fully inflated condition illustrated in FIG. 2.

As the air bag 30 inflates, the body portion 42 of the air bag moves away from the base portion 40 of the air bag, in a direction indicated by the arrow 146 (to the right as viewed in FIG. 1). As the body portion 42 of the air bag 30 moves in the direction 146, the intermediate portion 90 of the first tether 60, which is sewn to the center panel 32, moves away from the first and second end portions 86 and 88 of the first tether. The intermediate portion 124 of the second tether 70, which is sewn to the intermediate portion 90 of the first tether 60, moves away from the first and second end portions 120 and 122 of the second tether.

The first and second tethers 60 and 70 extend until the force of the outwardly moving body portion 42 of the air bag 30 exerts a tensile load on the tether assembly 58. The first and second tethers 60 and 70 are in an "extended" condition shown in FIG. 1. The first and second tethers 60 and 70 are both extended to their effective length, and are both resisting movement of the body portion 42 of the air bag 30.

The second tether 70, which has a relatively high elongation and no predetermined weakened areas, is able to stretch under this applied load. The second tether 70 resists movement of the body portion 42 of the air bag 30 in the direction 146, but the second tether 70 does not break. The first tether 60 also resists movement of the body portion 42 of the air bag 30 in the direction 146, so long as the tensile load on the first tether is less than the predetermined threshold value.

The tensioning of the first and second tethers 60 and 70 temporarily slows or stops movement of the body portion 42 of the air bag 30 away from the base portion 40. The effective length of the first and second tethers 60 and 70 is selected so that the body portion 42 of the air bag 30 is moving at a predetermined speed in the direction 146 when at a predetermined distance from the deployment opening 24 in the container 12. The predetermined distance is the distance between the body portion 42 of the air bag 30 and the deployment opening 24 when the first and second tethers 60 and 70 are extended to their effective length.

As the air bag 30 continues to inflate, the tensile load on the first and second tethers 60 and 70 increases. The second tether 70 stretches and extends. The first tether 60 has relatively low elongation and ruptures, or breaks, when the tensile load on the first tether exceeds the predetermined threshold value. The first tether 60 ruptures at the predetermined weakened portions 100 and 102.

When the first tether 60 ruptures, the intermediate portion 90 of the first tether is again free to move away from the end portions 86 and 88 of the first tether. The intermediate portion 124 of the second tether 70, which is sewn to the intermediate portion 90 of the first tether 60, moves away from the end portions 120 and 122 of the second tether.

The second tether 70 then extends to the condition shown in FIG. 2. The second tether 70 stretches as it extends, constantly increasing the resistance to movement of the body portion 42 of the air bag 30 away from the base portion 40. The second tether 70 is constructed to be strong enough to resist the force of the inflating air bag 30 and to remain unbroken during inflation of the air bag. The flow of inflation fluid into the air bag 30 decreases, and the pressure in the air bag stops rising, before the second tether 70 is stretched to its breaking point. The air bag 30 assumes a fully inflated condition as shown in FIG. 2.

Figure 5:
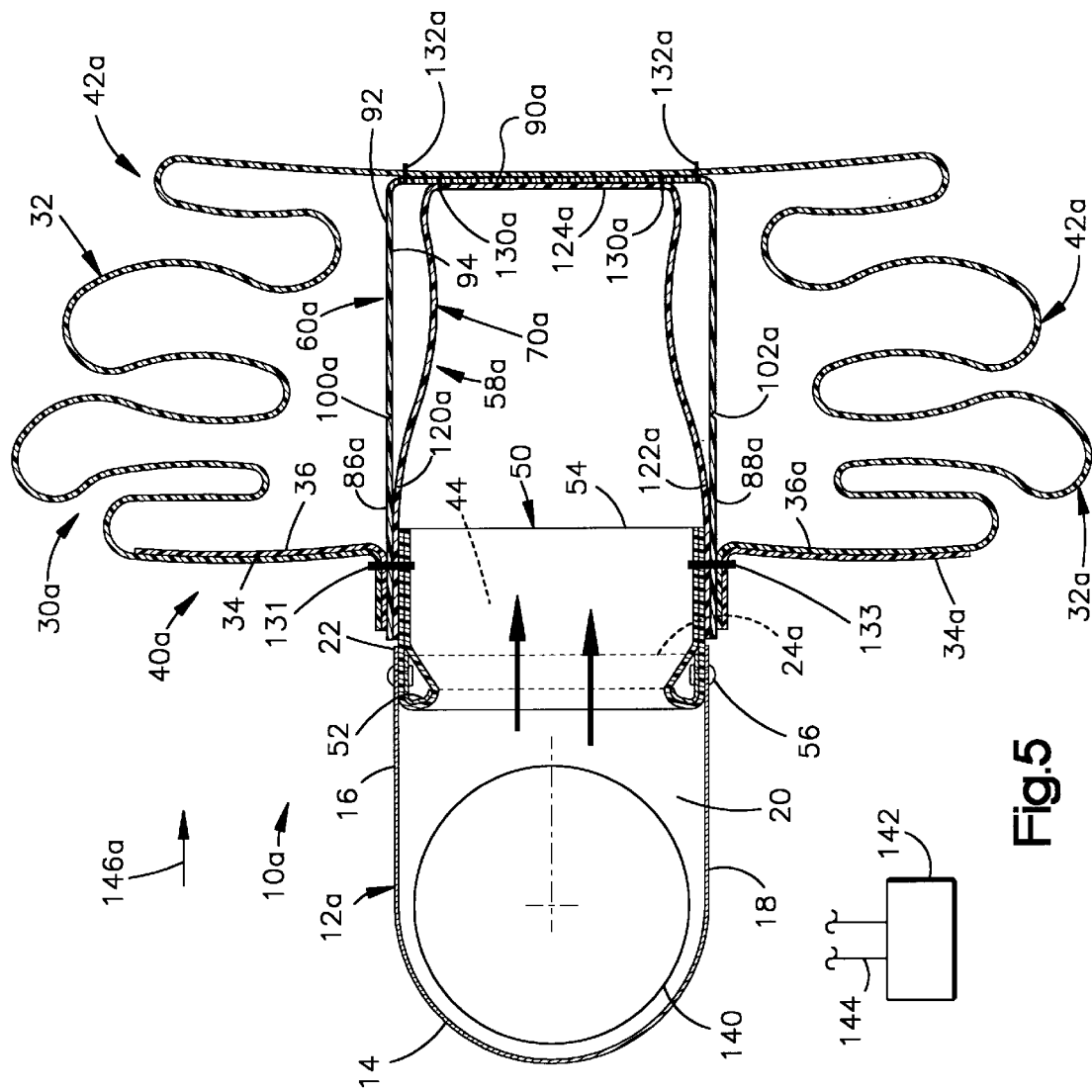
FIG. 5 is a view similar to FIG. 1 of a vehicle safety apparatus constructed in accordance with a second embodiment of the present invention.

FIG. 5 illustrates an air bag module 10a including a tether assembly 58a which is constructed in accordance with a second embodiment of the present invention. The tether assembly 58a is illustrated in FIG. 5 as being connected with an air bag 30a identical to the air bag 30 (FIGS. 1–4).

In the tether assembly 58a, the second tether 70a is generally similar in configuration to the first tether 60a. The second tether 70a is made from a higher elongation material than the first tether 60a. The second tether 70a does not have any predetermined weakened portions, but instead has a uniform resistance to rupturing, or breaking, along its entire length.

The second tether 70a is the same length as the first tether 60a when the tethers are in a free or unstressed condition. As a result, because the sew circle 130a is smaller than the sew circle 132a, the second tether does not become taut (reach its effective length) when the first tether becomes taut (reaches its effective length). The effective length of the second tether 70a is greater than the effective length of the first tether 60a by an amount equal to twice the radial distance between the sew lines 130a and 132a.

When the air bag 30a inflates from a folded, stored condition (not shown) to a partially inflated condition illustrated in FIG. 5, the first tether 60a becomes taut first. The force of the outwardly moving body portion 42a of the air bag 30a exerts a tensile load on the first tether 60a. The first tether 60a resists movement of the body portion 42a of the air bag 30a in the direction 146a, so long as the tensile load on the first tether is less than the predetermined threshold value.

The tensioning of the first tether 60a temporarily slows or stops movement of the body portion 42a of the air bag 30a away from the base portion 40a. The effective length of the first tether 60a is selected so that the body portion 42a of the air bag 30a is moving at a predetermined speed in the direction 146a when at a predetermined distance from the deployment opening 24a in the container 12a. The predetermined distance is the distance between the body portion 42a of the air bag 30a and the deployment opening 24a when the first tether is extended to its effective length.

As the air bag 30a continues to inflate, the tensile load on the first tether 60a increases. The first tether 60a has relatively low elongation and ruptures, or breaks, when the tensile load on the first tether exceeds the predetermined threshold value. The first tether 60a ruptures at the predetermined weakened portions 100a and 102a.

When the first tether 60a ruptures, the intermediate portion 90a of the first tether is again free to move away from the end portions 86a and 88a of the first tether. The intermediate portion 124a of the second tether 70a, which is sewn to the intermediate portion 90a of the first tether 60a, moves away from the end portions 120a and 122a of the second tether.

The second tether 70a then extends to its effective length, becoming taut. The second tether 70a then continues to extend and stretches as it extends, increasing the resistance to movement of the body portion 42a of the air bag 30a away from the base portion 40a. The second tether 70a is constructed to be strong enough to resist the force of the inflating air bag 30a and to remain unbroken during inflation of the air bag. The flow of inflation fluid into the air bag 30a decreases, and the pressure in the air bag stops rising, before the second tether 70a is stretched to its breaking point. The air bag 30a assumes a fully inflated condition as shown in FIG. 2.

FIGS. 6–7 illustrate schematically a vehicle safety apparatus 200 constructed in accordance with a third embodiment of the present invention. The safety apparatus 200 includes a retaining ring or retainer 202 to which is connected, in a known manner, an inflatable device in the form of an air bag 204. The retainer 202 has a circumference large enough to contain substantially all the fabric material of the air bag 204 when the air bag is in a deflated condition as shown in FIG. 6.

When the safety apparatus 200 is mounted to a reaction can which is then, in turn, fastened to a vehicle instrument panel (not shown), the retainer 202 is coupled to an air bag inflator 206 (shown schematically in FIG. 6). The retainer 202 defines an inflation fluid opening 208 in the air bag 204 through which inflation fluid from the inflator 206 is directed to inflate the air bag 204.

A pair of locator tabs 210, one of which is shown in FIG. 6, project from one long side 212 of the retainer. The locator tabs 210 help to position the retainer 202 and, thus, the safety apparatus 200, in the reaction can. The locator tabs 210 are disposed at opposite ends (above and below the plane of the paper as viewed in FIG. 6) of the retainer. In addition, three rivet openings 214 and three rivet openings 300, one of each of which is shown in FIG. 6, are spaced along both long sides 216 and 212, respectively, of the retainer.

The safety apparatus 200 includes a wrap 220 (FIGS. 6 and 7) for maintaining the air bag 204 in a packed condition prior to actuation of the inflator 206. The wrap 220 is preferably made from the same type of woven fibrous material as the tethers 60 and 70 (FIGS. 1–4).

The wrap 220 has a generally rectangular configuration when laid flat as shown in FIG. 7. First and second side edges 222 and 224 of the wrap 220 extend parallel to a longitudinal central axis 226 of the wrap. The axis 226 extends between first and second end portions 228 and 230 of the wrap 220. The wrap 220 has first and second opposite side surfaces 232 and 234 (FIG. 6). A plurality of load bearing warp yarns or first fibers (not shown) of the wrap 220 extend axially along the length of the wrap.

A pair of mounting tabs 240, each having a slot 242, project from the first end portion 228 of the wrap 220. A pair of mounting tabs 244, each having a slot 246, project from the second end portion 230 of the wrap 220. Three rivet openings 248 are disposed in an axially central portion 249 of the wrap 220.

The wrap 220 has two predetermined weakened portions 250 and 252. The first weakened portion 250 is located between the rivet openings 248 and the first end portion 228 of the wrap 220. The second weakened portion 252 of the wrap 220 is located between the rivet openings 248 and the second end portion 230 of the wrap. The second weakened portion 252 is identical in construction to the first weakened portion 250 and, therefore, is not described in detail.

The first weakened portion 250 is in the form of a tear line which extends between the first and second side edges 222 and 224 of the wrap 220 in a direction perpendicular to the axis 226. At the first weakened portion 250, the material of the wrap 220 is cut through or severed with a plurality of first cuts shown schematically at 254. The first cuts 254 extend in a straight line generally perpendicular to the longitudinal axis 226 of the wrap 220. The line of first cuts 254 extends across substantially the entire width of the wrap 220.

Each one of the first cuts 254 severs all of the first fibers (not shown) located between the ends of the first cut. The first cuts 254 are spaced apart from each other and define a plurality of gaps 256, one between each pair of adjacent first cuts. A plurality of first fibers of the wrap 220 extend axially through each one of the gaps 256.

The weakened portion also has a plurality of second cuts 260 spaced apart from the first cuts 254. The second cuts 260 extend in a straight line across substantially the entire width of the wrap 220. The line of second cuts 260 is spaced apart axially from, and extends parallel to, the line of first cuts 254.

The second cuts 260 overlap the first cuts 254 across substantially the entire width of the wrap 220. Specifically, each one of the second cuts 260 extends for more than the length of a respective one of the gaps 256 between a pair of adjacent first cuts 254. The length and placement of the second cuts 260 are selected so that each second cut severs every first fiber of the wrap 220 in the respective gap 256 across which the second cut extends. As a result, all the first fibers of the wrap 220, that is, all the load-bearing fibers, are cut at the first weakened portion 250 of the wrap. There are no unsevered first fibers extending in the direction of the force loading on the wrap 220.

Because of the presence of the two predetermined weakened portions 250 and 252 of the wrap 220, the wrap is rupturable at the predetermined weakened portions during inflation of the air bag 204, in a manner described below. Specifically, the predetermined weakened portions 250 and 252 cause the wrap 220 to rupture when the tensile load on the wrap, acting between the central portion 249 of the wrap and the end portions 228 and 230 of the wrap, exceeds a predetermined threshold value.

The wrap 220 is assembled with the air bag 204 and the retainer 202 in the manner shown in FIG. 6. The wrap 220 is extended around the folded air bag 204 and the retainer 202 so that the locator tabs 210 on the retainer 202 extend through the slots 242 and 246 in the mounting tabs 240 and 244, respectively, on the wrap. The rivet openings 248 in the wrap 220 are aligned with the rivet openings 214 in the retainer 202. Rivets 266 extend through the rivet openings 248 in the wrap 220 and through the rivet openings 214 in the retainer 202 and secure the safety apparatus 200 to the reaction can which is, thereafter, mounted in the vehicle instrument panel.

The first weakened portion 250 of the wrap 220 is disposed on the right side (as viewed in FIG. 6) of the safety apparatus 200. The second weakened portion 252 of the wrap 220 is disposed on the opposite side (the left side as viewed in FIG. 6) of the safety apparatus 200 from the first weakened portion 250. When the air bag 204 and the wrap 220 are mounted in the reaction can with the inflator 206, the first weakened portion 250 of the wrap is presented toward the inflator 206. The second weakened portion 252 of the wrap 220 is presented generally toward the occupant compartment of the vehicle when the reaction can is mounted in the vehicle.

In the event of a vehicle emergency situation such as sudden vehicle deceleration which requires inflation of the air bag 204 to help protect the vehicle occupant, the inflator 206 is actuated, in a known manner, to direct inflation fluid toward and into the air bag to inflate the air bag. The inflation fluid flows from the inflator 206 and contacts the safety apparatus 200. The inflation fluid first contacts the wrap 220. The force of the inflation fluid acts on the wrap 220 so as to stress the wrap axially at the location of the first weakened portion 250 of the wrap.

The force of the inflation fluid causes the wrap 220 to rupture at the first weakened portion 250. Inflation fluid flows through the opened wrap 220 in a direction to the left as viewed in FIG. 6. The inflation fluid flows into the air bag 204 through the inflation fluid opening 208.

The inflation fluid inflates the air bag 204 to a partially inflated condition (not shown) in which the inflating air bag pushes outward (to the left as viewed in FIG. 6) on the wrap 220. The force of the inflating air bag 204 acts on the wrap 220 so as to stress the wrap axially at the location of the second weakened portion 252 of the wrap. The wrap 220 breaks at the second weakened portion 252. The opening of the wrap 220 at the second weakened portion 252 allows the air bag 204 to inflate from the partially inflated condition to a fully inflated condition.

The wrap 220 may, alternatively, be made from a flexible sheet material which is not fibrous, that is, which is does not have warp yarns extending in the direction of load on the material. One suitable material of this type is Tyvek® brand polyethylene plastic which is available from E. I. DuPont de Nemours & Co. of Delaware. This material preferably has a thickness of about one-half mil (about 0.0005 inches).

FIG. 8 illustrates schematically an alternative configuration for a tear line or weakened portion 270 of a member 272 such as a tether or bag wrap. At the weakened portion 270, the material of the member 272 is cut through or severed with a plurality of first cuts 274 and a plurality of second cuts 276. The first cuts 274 are diagonal cuts extending at an angle to the width and to the axis 278 of the member 272. The second cuts 276 are diagonal cuts positioned alternately between and extending parallel to the first cuts 274. The second cuts 276 extend at an angle to the width and to the axis 278 of the member 272.

The member 272 is preferably made from a fibrous material which has warp yarns or first fibers extending axially along the length of the member, that is, in the direction of load on the member. The second cuts 276 overlap the first cuts 274 across substantially the entire width of the member 272. As a result, all the first fibers of the member 272, that is, all the load-bearing fibers, are cut at the weakened portion 270 of the member. There are no unsevered first fibers extending in the direction of the force loading on the member 272.

From the above description of the invention, those skilled in the art will perceive improvements, changes and modifications in the invention. For example, the present invention could be used in conjunction with an air bag having a configuration other than a cylindrical configuration. Also, the cuts in the predetermined weakened portion of the member could be differently configured or oriented, so long as they cut all or substantially all of the load bearing or first fibers if the member is made from a fibrous material. Such improvements, changes and modifications within the skill of the art are intended to be covered by the appended claims.

Having described the invention, we claim:

1. A vehicle safety apparatus comprising:

an inflatable vehicle occupant protection device having a base portion and having a body portion connected with said base portion and inflatable in a direction away from said base portion into aninflated condition;

a first tether having at least one end portion connected with said base portion of said inflatable device and an intermediate portion which is connected with said body portion of said inflatable device at at least two locations spaced apart from each other by a susbstantial distance; and a second tether, separate from said first tether, having at least one end portion connected with said base portion of said inflatable device and an intermediate portion which is connected with said body portion of said inflatable device;

said first tether having a predetermined weakened portion;

said second tether having substantially higher elongation than said first tether;

said inflatable device having a partially inflated condition in which said first tether resists movement of said body portion of said inflatable device away from said base portion;

said first tether being rupturable at said predetermined weakened portion under the force of said inflatable device during inflation to enable movement of said inflatable device from the partially inflated condition to a fully inflated condition; and said second tether stretching during movement of said inflatable device from the partially inflated condition to the fully inflated condition.

2. An apparatus as set forth in claim 1 wherein said two locations are points on a circular stitching section.

3. An apparatus as set forth in claim 1 wherein respective first and second end portions of said first and second tethers are sewn to said base portion of said inflatable device, said predetermined weakened portion of said first tether being disposed between said end portions of said tethers and said intermediate portions of said tethers.

4. An apparatus as set forth in claim 3 wherein said first end portion of said first tether extends between said base portion of said inflatable device and one of said at least two locations on said body portion of said inflatable device, said second end portion of said first tether extending between said base portion of said inflatable device and another one of said at least two locations on said body portion of said inflatable device.

5. An apparatus as set forth in claim 1 wherein said second tether has an effective length which is at least about the same as the effective length of said first tether.

6. An apparatus as set forth in claim 1 wherein said first tether has a length selected so that said body portion of said inflatable device has a predetermined speed in a direction of movement away from said base portion when said first tether is resisting movement of said body portion of said inflatable device away from said base portion.

7. A vehicle safety apparatus comprising:

an inflatable vehicle occupant protection device;

a tearable member having a predetermined weakened portion extending across the width of said member; and means for connecting said member with said inflatable device to resist inflation of said inflatable device;

said inflatable device having a partially inflated condition in which said member is subjected to force less than a predetermined amount acting in a first direction transverse to the width of said member and is unruptured and resists inflation of said inflatable device;

said member being rupturable at said predetermined weakened portion under said predetermined amount of force to enable movement of said inflatable device from the partially inflated condition to a fully inflated condition;

said predetermined weakened portion of said member having a plurality of first cuts spaced apart from each other to define gaps and a plurality of second cuts spaced apart from said first cuts, said second cuts overlapping said first cuts across substantially the entire width of said member.

8. A vehicle safety apparatus as set forth in claim 7 wherein said member comprises a plurality of fibers extending along the length of said member, said first cuts and said second cuts together severing at least substantially all of the fibers of said member extending in said first direction in said predetermined weakened portion of said member.

9. A vehicle safety apparatus as set forth in claim 7 wherein said first cuts are transverse cuts extending across the width of said member, said second cuts being diagonal cuts which extend at an angle to the width of said member, each one of said diagonal cuts extending through a respective one of said gaps between a pair of adjacent transverse cuts.

10. A vehicle safety apparatus as set forth in claim 7 wherein said first cuts are transverse cuts extending in first line across the width of said member, said second cuts being transverse cuts extending across the width of said member in a second line spaced from said first line.

11. A vehicle safety apparatus as set forth in claim 7 wherein said first cuts are diagonal cuts extending at angle to the width of said member, said second cuts being diagonal cuts positioned alternately between said first cuts and extending at an angle to the width of said member.

12. A vehicle safety apparatus as set forth in claim 7 wherein said member is a tether.

13. A vehicle safety apparatus as set forth in claim 7 wherein said member comprises a wrap extending around said inflatable device when said inflatable device is in a deflated condition, said predetermined weakened portion of member rupturing during movement of said inflatable device from the deflated condition to the fully inflated condition.

14. A vehicle safety apparatus comprising:

an inflatable vehicle occupant protection device having a base portion and having a body portion connected with said base portion and inflatable in a direction away from said base portion into an inflated condition; and first and second tethers sewn between said base portion of said inflatable device and said body portion of said inflatable device;

said first tether having a predetermined weakened portion;

said second tether having substantially higher elongation than said first tether;

said second tether having an effective length which is substantially the same as the effective length of said first tether;

said inflatable device having a partially inflated condition in which said first tether is extended to its effective length and resists movement of said body portion of said inflatable device away from said base portion;

said first tether being rupturable at said predetermined weakened portion under the force of said inflatable device during inflation to enable movement of said inflatable device from the partially inflated condition to a fully inflated condition; and said second tether stretching during movement of said inflatable device from the partially inflated condition to the fully inflated condition.

15. An apparatus as set forth in claim 14 wherein said first tether has a length selected so that said body portion of said inflatable device has a predetermined speed in a direction of movement away from said base portion when said first tether is resisting movement of said body portion of said inflatable device away from said base portion.

16. An apparatus as set forth in claim 14 wherein said first tether overlies said second tether, said first tether being connected with said body portion of said inflatable device at at least two locations spaced apart from each other by a substantial distance.

17. An apparatus as set forth in claim 14 wherein said second tether has a uniform resistance to rupturing along its length.

18. A vehicle safety apparatus comprising:

an inflatable vehicle occupant protection device having a base portion and having a body portion connected with said base portion and inflatable in a direction away from said base portion into an inflated conditions; and first and second tethers sewn between said base portion of said inflatable device and said body portion of said inflatable device;

said first and second tethers comprising material having fibers;

said first tether having a predetermined weakened portion;

said second tether having substantially higher elongation than said first tether;

said second tether having an effective length which is at least about the same as the effective length of said first tether;

said inflatable device having a partially inflated condition in which said first tether is extended to its effective length and resists movement of said body portion of said inflatable device away from said base portion;

said first tether being rupturable at said predetermined weakened portion under the force of said inflatable device during inflation to enable movement of said inflatable device from the partially inflated condition to a fully inflated condition; and said second tether stretching during movement of said inflatable device from the partially inflated condition to the fully inflated condition;

said predetermined weakened portion of said first tether including a plurality of first cuts in the material of said first tether spaced apart from each other to define gaps and a plurality of second cuts in the material of said first tether which extend at an angle to said first cuts and which extend through said gaps so that said first cuts and said second cuts, together, sever at least substantially all of the fibers of said first tether extending in the direction of the force applied to said first tether by said inflatable device during inflation.

19. An apparatus as set forth in claim 18 wherein said first cuts are transverse cuts extending generally perpendicular to the longitudinal axis of the first tether, said second cuts being diagonal cuts which extend at an angle to the longitudinal axis of the first tether, each one of said diagonal cuts extending through a respective one of the gaps between a pair of adjacent transverse cuts, the length and orientation of each one of said diagonal cuts being selected so that each of said diagonal cuts severs every fiber which is in the respective gap through which each of said diagonal cuts extends and which extends in the direction of the force applied to said first tether by said inflating inflatable device.

20. A vehicle safety apparatus comprising:

an inflatable vehicle occupant protection device;

a tearable member comprising a plurality of fibers extending in a first direction in said member, said member having a rupturable predetermined weakened portion; and means for connecting said member with said inflatable device to resist inflation of said inflatable device;

said inflatable device having a partially inflated condition, in which said member is subjected to force less than a predetermined amount acting in said first direction and is unruptured and resists inflation of said inflatable device, and a fully inflated condition;

said member being rupturable at said predetermined weakened portion under said predetermined amount of force to enable movement of said inflatable device from the partially inflated condition to the fully inflated condition;

said predetermined weakened portion of said member having a plurality of cuts spaced apart from each other to define gaps, said plurality of cuts severing at least substantially all of the fibers of said member extending in said first direction in said predetermined weakened portion of said member;

said inflatable device having a base portion and having a body portion connected with said base portion and inflatable in a direction away from said base portion into an inflated condition;

said member comprising a first tether connected between said base portion of said inflatable device and said body portion of said inflatable device, said first tether having said predetermined weakened portion;

said first tether being extended to a first length and resisting movement of said body portion of said inflatable device away from said base portion when said inflatable device is in the partially inflated condition;

said first tether being rupturable at said predetermined weakened portion under the force of said inflatable device during inflation to enable movement of said inflatable device from the partially inflated condition to the fully inflated condition;

said apparatus further comprising a second tether, separate from said first tether, sewn between said base portion of said inflatable device and said body portion of said inflatable device, said second tether being at least the same effective length as said first tether, said second tether having substantially higher elongation than said first tether, said second tether stretching during movement of said inflatable device from the partially inflated condition to the fully inflated condition.

21. A vehicle safety apparatus comprising:

an inflatable vehicle occupant protection device;

a tearable member comprising a plurality of fibers extending in a first direction in said member, said member having a rupturable predetermined weakened portion; and means for connecting said member with said inflatable device to resist inflation of said inflatable device;

said inflatable device having a partially inflated condition, in which said member is subjected to force less than a predetermined amount acting in said first direction and is unruptured and resists inflation of said inflatable device, and a fully inflated condition;

said member being rupturable at said predetermined weakened portion under said predetermined amount of force to enable movement of said inflatable device from the partially inflated condition to the fully inflated condition;

said predetermined weakened portion of said member having a plurality of cuts spaced apart from each other to define gaps, said plurality of cuts severing at least substantially all of the fibers of said member extending in said first direction in said predetermined weakened portion of said member;

said member further comprising a flexible wrap extending around said inflatable device when said inflatable device is in a deflated condition, said predetermined weakened portion of said member rupturing during movement of said inflatable device from the partially inflated condition to the fully inflated condition;

said member having a second predetermined weakened portion which is rupturable to enable flow of inflation fluid into said inflatable device to inflate said inflatable device.

22. A vehicle safety apparatus comprising:

an inflatable vehicle occupant protection device;

a tearable member comprising a plurality of fibers extending in a first direction in said member, said member having a rupturable predetermined weakened portion; and means for connecting said member with said inflatable device to resist inflation of said inflatable device;

said inflatable device having a partially inflated condition, in which said member is subjected to force less than a predetermined amount acting in said first direction and is unruptured and resists inflation of said inflatable device, and a fully inflated condition;

said member being rupturable at said predetermined weakened portion under said predetermined amount of force to enable movement of said inflatable device from the partially inflated condition to the fully inflated condition;

said predetermined weakened portion of said member having a plurality of cuts spaced apart from each other to define gaps, said plurality of cuts severing at least substantially all of the fibers of said member extending in said first direction in said predetermined weakened portion of said member;

said plurality of cuts comprising a plurality of first cuts spaced apart from each other to define said gaps and a plurality of second cuts spaced apart from said first cuts along said first direction, said first cuts and said second cuts together severing at least substantially all of said fibers of said member extending in said first direction.

23. A vehicle safety apparatus comprising:

an inflatable vehicle occupant protection device;

a tearable member comprising a plurality of fibers extending in a first direction in said member, said member having a rupturable predetermined weakened portion; and means for connecting said member with said inflatable device to resist inflation of said inflatable device;

said inflatable device having a partially inflated condition, in which said member is subjected to force less than a predetermined amount acting in said first direction and is unruptured and resists inflation of said inflatable device, and a fully inflated condition;

said member being rupturable at said predetermined weakened portion under said predetermined amount of force to enable movement of said inflatable device from the partially inflated condition to the fully inflated condition;

said predetermined weakened portion of said member having a plurality of cuts spaced apart from each other to define gaps, said plurality of cuts severing at least substantially all of the fibers of said member extending in said first direction in said predetermined weakened portion of said member;

said plurality of cuts comprising a plurality of first cuts spaced apart from each other to define said gaps and a plurality of second cuts spaced apart from said first cuts, said first cuts and said second cuts together severing at least substantially all of said fibers of said member extending in said first directions;

said first cuts being transverse cuts extending generally perpendicular to said first direction, said second cuts being diagonal cuts which extend at an angle to said first direction, each one of said diagonal cuts extending through a respective one of said gaps between a pair of adjacent transverse cuts.

24. A vehicle safety apparatus as set forth in claim 23 wherein the length and orientation of each one of said diagonal cuts is selected so that each one of said diagonal cuts severs every load-bearing fiber in the respective gap through which each one of said diagonal cuts extends.

* * * * *